US010380862B1

(12) United States Patent
Heidary

(10) Patent No.: US 10,380,862 B1
(45) Date of Patent: Aug. 13, 2019

(54) FIRE PROTECTION SYSTEM WITH FAN SHUT OFF, INCLUDING A CAMERA AND A DISPLAY UNIT

(71) Applicant: Massoud Mike Heidary, Gaithersburg, MD (US)

(72) Inventor: Massoud Mike Heidary, Gaithersburg, MD (US)

(73) Assignee: Massoud M Heidary

( * ) Notice: Subject to any disclaimer, the term of this patent is extended or adjusted under 35 U.S.C. 154(b) by 0 days.

(21) Appl. No.: 16/350,009

(22) Filed: Sep. 17, 2018

(51) Int. Cl.
| | |
|---|---|
| *G08B 17/10* | (2006.01) |
| *A62C 2/06* | (2006.01) |
| *G05B 19/042* | (2006.01) |
| *H04N 5/232* | (2006.01) |
| *G08B 17/12* | (2006.01) |
| *G08B 25/10* | (2006.01) |
| *G08B 3/10* | (2006.01) |
| *G08B 5/22* | (2006.01) |
| *G05B 15/02* | (2006.01) |
| *F24F 11/30* | (2018.01) |
| *F24F 11/58* | (2018.01) |
| *F24F 11/33* | (2018.01) |
| *F24F 11/56* | (2018.01) |

(Continued)

(52) U.S. Cl.
CPC ............... *G08B 17/10* (2013.01); *A62C 3/14* (2013.01); *F24F 11/30* (2018.01); *F24F 11/33* (2018.01); *F24F 11/56* (2018.01); *F24F 11/57* (2018.01); *F24F 11/58* (2018.01); *G05B 15/02* (2013.01); *G05B 19/042* (2013.01); *G08B 3/10* (2013.01); *G08B 5/22* (2013.01); *G08B 17/12* (2013.01); *G08B 17/125* (2013.01); *G08B 25/10* (2013.01); *H04L 12/2825* (2013.01); *H04L 12/2827* (2013.01); *H04L 67/025* (2013.01); *H04N 5/232* (2013.01); *A62C 35/00* (2013.01); *G05B 2219/2614* (2013.01); *G05B 2219/2642* (2013.01); *H04L 2012/285* (2013.01); *H04L 2012/2841* (2013.01)

(58) Field of Classification Search
CPC . G08B 3/10; G08B 5/22; G08B 17/10; G08B 17/12; G08B 17/125; G08B 25/10; G05B 15/02; G05B 2219/2642; F24F 11/30; F24F 11/33; F24F 11/56; F24F 11/57; F24F 11/58; H04L 12/2825; H04L 12/2827; H04L 2012/285; H04L 2012/2841; H04L 67/025; A62C 2/24; A62C 37/44; A62C 99/00
See application file for complete search history.

(56) References Cited

U.S. PATENT DOCUMENTS

| | | |
|---|---|---|
| 4,068,568 A | 1/1978 | Moss |
| 4,765,231 A | 8/1988 | Aniello |

(Continued)

*Primary Examiner* — Crystal J Barnes-Bullock

(57) ABSTRACT

The invention relates to system for suppressing the fire and warning to the occupants are disclosed. The described system includes a thermostat and Fan in an HVAC interface with a residential HVAC system, a receiver operable to receive a signal indicating the presence of a fire or smoke, and a processor in communication with the receiver and in response, sends a signal to the HVAC interface to cause the residential HVAC system to be shut down. In addition the system also includes camera system sending signal to a display unit displaying the floor and room number on the screen, thus warning the occupants the location of the fire.

6 Claims, 3 Drawing Sheets

(51) Int. Cl.
*F24F 11/57* (2018.01)
*H04L 29/08* (2006.01)
*H04L 12/28* (2006.01)
*A62C 35/00* (2006.01)

(56) References Cited

U.S. PATENT DOCUMENTS

| | | | |
|---|---|---|---|
| 4,944,216 A | 7/1990 | McCutchen | |
| 6,102,793 A | 8/2000 | Hansen | |
| 7,102,529 B2 | 9/2006 | Whitney | |
| 7,696,891 B2* | 4/2010 | Whitney | A62C 99/00 340/628 |
| 9,905,122 B2* | 2/2018 | Sloo | F24F 11/30 |
| 10,161,837 B2* | 12/2018 | Ajay | G01N 15/06 |
| 2008/0151056 A1* | 6/2008 | Ahamefula | H04N 5/23203 348/164 |
| 2015/0204561 A1* | 7/2015 | Sadwick | G05D 23/1905 236/1 C |
| 2015/0213697 A1* | 7/2015 | Knox | G08B 17/10 382/103 |
| 2017/0122580 A1* | 5/2017 | Karamanos | F24F 5/0003 |
| 2018/0227141 A1* | 8/2018 | Zribi | G05B 15/02 |
| 2019/0074990 A1* | 3/2019 | Reimer | H04L 12/2807 |
| 2019/0080589 A1* | 3/2019 | Orr | G08B 25/009 |
| 2019/0081814 A1* | 3/2019 | Orr | H04L 12/2827 |

\* cited by examiner

FIRE PROTECTION SYSTEM WITH FAN SHUT OFF, INCLUDING A CAMERA AND A DISPLAY UNIT

BRIEF SUMMARY

Field of the Invention

The present invention relates fire protection system with automatic fan shut off, including a camera and a display unit.

SUMMARY OF THE INVENTION

Embodiments Of the present invention provide system for suppressing the spread of fire by shutting off the fan in a heating, ventilation, and air conditioning (HVAC) system when a fire is detected by the smoke detector. In one embodiment, the a system for suppressing the fire comprises a smoke detector with a transmitter, transmitting signal to an HVAC interface, a receiver operable to receive a signal indicating the presence of fire, and in response, send a signal to the HVAC interface to cause the HVAC system to be shut down. The system, in addition includes a camera system. Upon detection of fire by the smoke detector, the camera is turned on and the signal is sent to a display unit informing the occupant the location of the fire.

In case of large building with more than one HVAC systems, the fire suppression system is designed to send signal to the affected HVAC system and cause the HVAC system to shut down.

Further details and advantages of the present invention are set forth below.

BRIEF DESCRIPTION OF THE FIGURES

The features, aspects, and advantages of the present invention are better understood when the following Detailed Description is read with reference to the accompanying drawings, wherein.

DETAILED DESCRIPTION

Embodiments of the present invention, a smoke alarm detects the fire, the smoke alarm is linked to a controller. The controller shuts off a fan in a forced air residential HVAC system, depriving the fire of the combustion air necessary to grow and spread and stopping the advance and transfer of fire-related toxins. In various embodiments, the controller may be a simple relay installed internally or externally to the HVAC system and connected to the fan controller and thermostat. In other embodiments, the relay is connected to a wireless receiver and receives the signal from the smoke detector transmitter to shut off the fan controller and thermostat. Embodiments of the present invention may include various additional features, including a signal to the telephone system, so that the controller can call the fire department.

Figure 1:
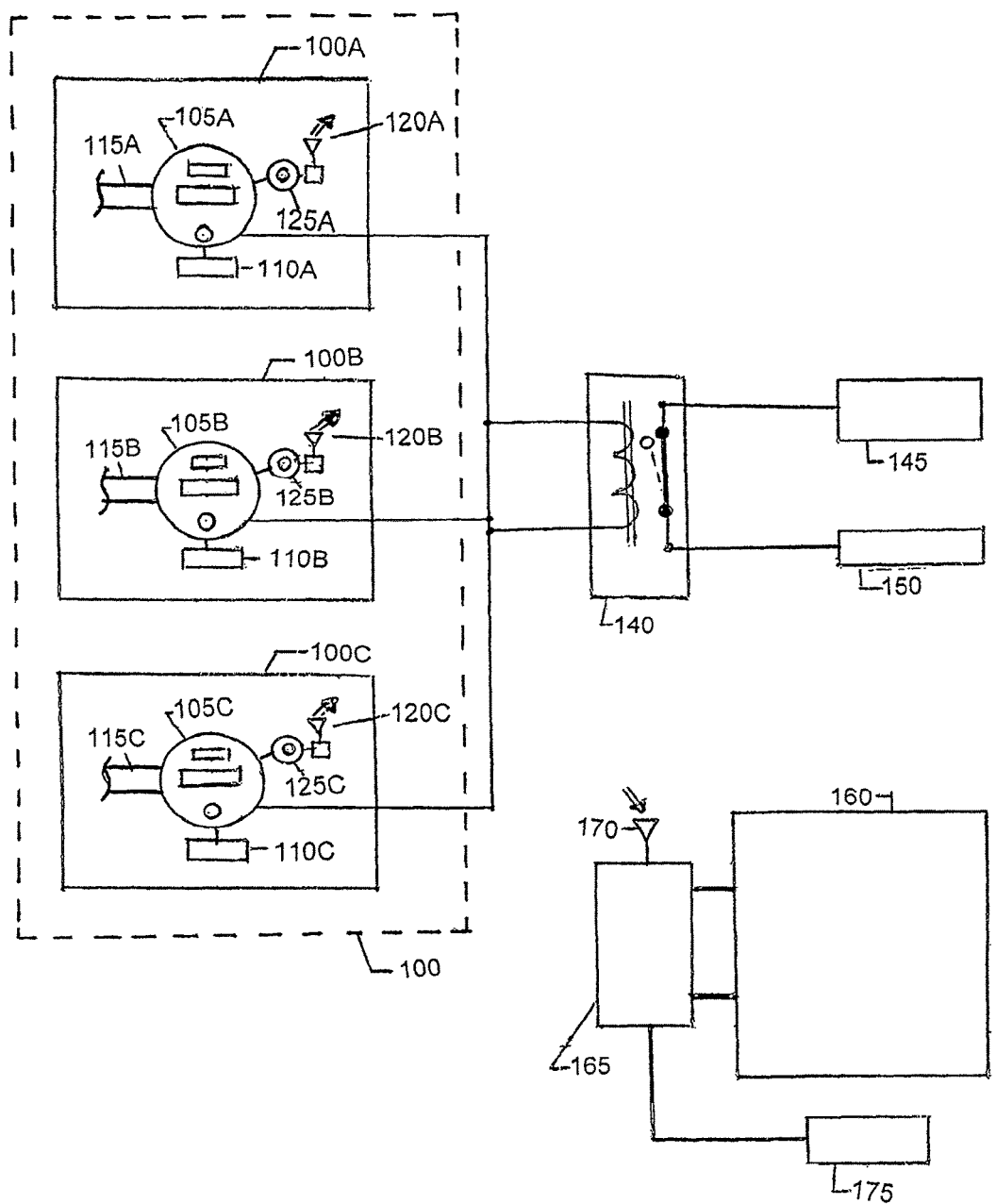
FIG. 1 is a block diagram illustrating the layout of smoke detectors with HVAC shut off system in a residential setting in an embodiment of the present invention complete with cameras and a display system incorporating a relay system for HVAC shut-off system.
Figure 3:
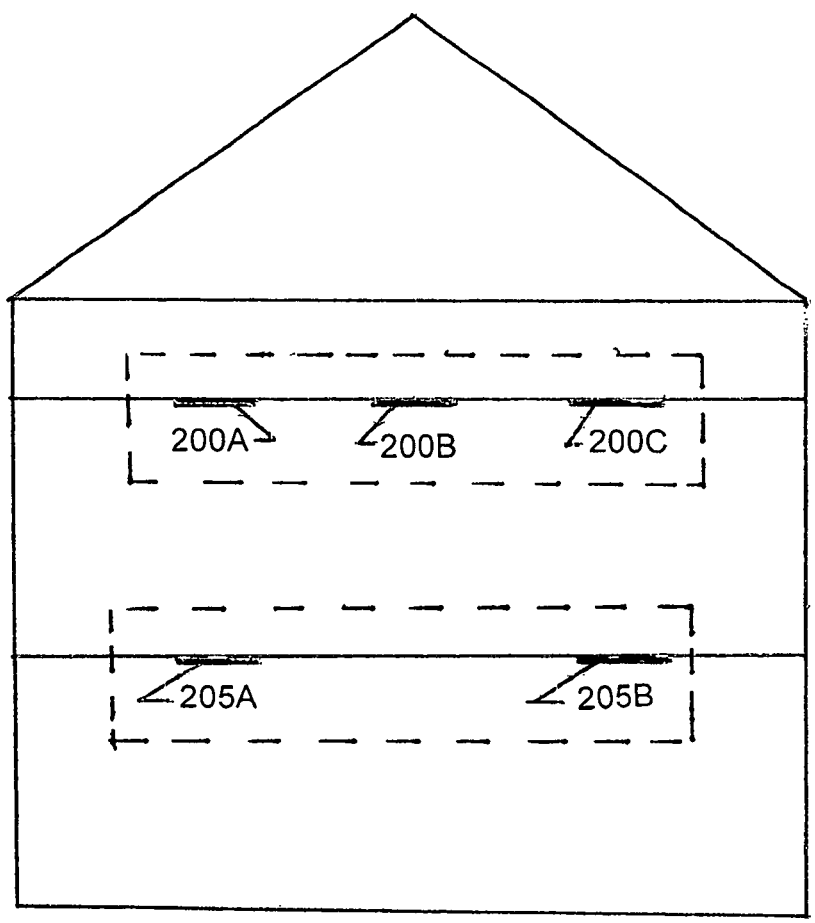
FIG. 3 is a general layout of a building incorporating more than one HVAC system.

FIG. 1 is a block diagram illustrating the layout of smoke detector units in an embodiment of the present invention. In the current embodiment, three smoke detector systems shown located in a single zone, however, more of less number of smoke detector units per zone can be present depending upon the size of the building. Also, as shown in FIG. 3, the building can have more than one zones, each with a set of smoke detection units and each set of smoke detection unit can be associated with corresponding relay, fan controller and thermostat unit.

FIG. 1 shows three smoke detection units, 100A, 100B and 100C located in a fire zone 100. Each smoke detection unit comprises a smoke detector 105A, 105B and 105C and each smoke detector is connected to an external power supply 115A, 115B, 115C, as well as an auxiliary power supply 110A, 110B, 100C. Further, each smoke detector is connected to a camera 125A, 125B, 125C and the camera is connected to a transmitter 120A, 120B, 120C. The system also comprises connection from each of the smoke detector or alarms to a normally closed relay 140. The relay 140 is connected to a fan controller 145 and a thermostat 150. Upon receiving the signal from the smoke detector, the relay cuts-off the power supply to the fan controller and the thermostat. In addition the system comprises a display unit 160 connected to a micro controller 165, and a microcontroller wireless receiver 170.

Figure 2:
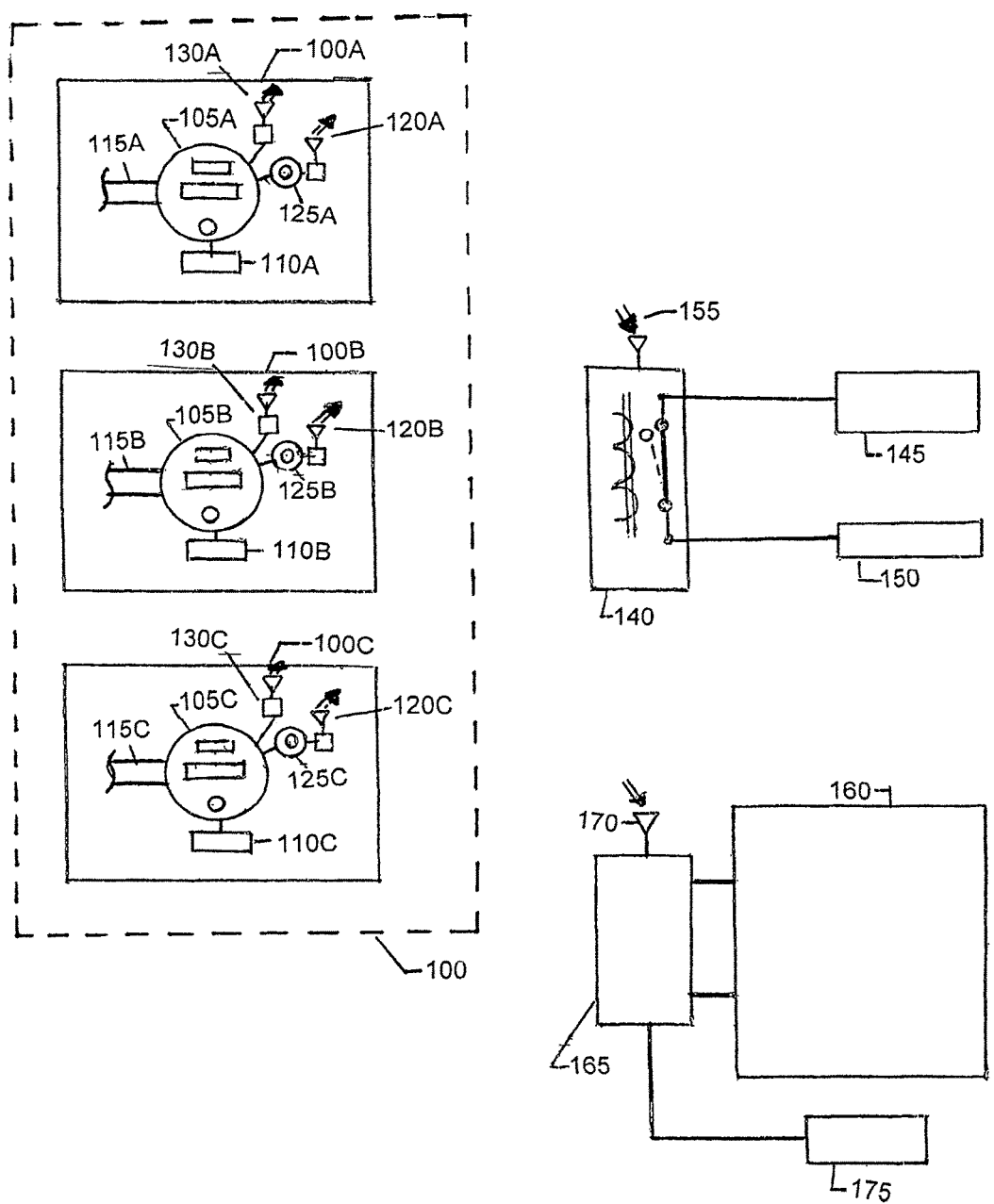
FIG. 2 is a block diagram illustrating the layout of smoke detectors with HVAC shut off system in a residential setting in an embodiment of the present invention complete with cameras and a display system, incorporating wireless signal transmitter to HVAC shut off system.

In the embodiment of FIG. 2, most of the features are the same as that of FIG. 1, but the smoke detector is connected to a transmitter 130A, 130B, 130C and the relay comprises a wireless receiver for fan controller 155.

So, in the embodiment of FIG. 1, when any of the smoke detector 105A, 105B, 105C, detects the smoke, the smoke detector sounds an alarm and a signal is sent to the relay, which in turn cuts-off the power supply to the fan controller and the thermostat, thereby cutting off the air supply to the affected area. At the same time, the wireless transmitter 120A, 120B, 120C of camera sends a signal to the receiver 170 of micro-controller 165, which displays the location of fire including the floor number, room number, etc., which is then displayed on display unit 160. The micro-controller 165 could be also send a signal to the fire department through telephone system 175, informing of the location of the fire to the fire department.

In the embodiment of FIG. 1, the smoke detector 105A, 105B, 105C is connected to the relay 140 using wires, however, in the embodiment of FIG. 2, the smoke detectors are provided with a transmitters 130A, 130B, 130C and the relay comprises a wireless receiver 155 for fan controller 145, so the signal is transmitted wirelessly and no hard wires are provided between the smoke detector and the relay. So, for embodiment of FIG. 2, when any of the smoke detector 105A, 105B, 105C, detects the smoke, the smoke detector sounds an alarm and a signal is wirelessly sent to the wireless receiver 155 connected to the relay 140, which in turn disconnects the fan controller 145 and thermostat 150, thereby cutting off the air supply to the affected area. At the same time, the wireless transmitter 120A, 120B, 120C of camera sends a signal to the receiver 170 of micro-controller 165, which displays the location of fire including the floor number, room number, etc., which is then displayed on display unit 160.

In the embodiment of FIGS. 1 and 2, the micro-controller 165 could be also send a signal to the fire department through telephone system 175, informing of the location of the fire to the fire department. The embodiment of FIGS. 1 and 2, discloses a single zone system 100. In case of FIG. 3, the building could have more than one fire zone 200A, 200B, 200C, 205A, 205B as shown by dotted lines.

The invention claimed is:

1. A system for suppressing fire in a building, the system comprising:
    a plurality of smoke detector units,
        each smoke detector unit comprising:
            a smoke detector,
            a power supply,
            an auxiliary power supply,
            a camera connected to the smoke detector, and
            a wireless transmission unit connected to the camera
    a normally closed relay,
    a fan controller connected to an HVAC unit,
    a thermostat,
    a display unit,
    a micro-controller for display unit,
    a wireless receiver for the micro-controller,
    a telephone system,
    wherein upon detection of a smoke by any one of the smoke detectors, the respective smoke detector passes a signal to a normally closed relay to open and to cut-off the power supply to the thermostat as well as fan controller thereby shutting off the fan unit; and activates the respective camera and the wireless transmission unit to transmit a signal to a wireless receiver connected to the micro-controller so as to display the location of the fire on the display unit connected to the micro-controller.

2. The system of claim 1, wherein said building comprises more than one fire zone.

3. The system of claim 1, wherein said telephone system is adapted to call fire department.

4. A system for suppressing fire in a building, the system comprising:
    a plurality of smoke detector units,
        each smoke detector unit comprising:
            a smoke detector,
            a wireless transmission unit connected to the smoke detector,
            a power supply,
            an auxiliary power supply,
            a camera connected to the smoke detector, and
            a wireless transmission unit connected to the camera,
    a normally closed relay,
    a fan controller connected to an HVAC unit,
    a wireless transmission unit connected to the relay,
    a thermostat,
    a display unit,
    a micro-controller for display unit,
    a wireless receiver for the micro-controller,
    a telephone system,
    wherein upon detection of a smoke by any one of the smoke detectors, the respective wireless transmission unit connected to the smoke detector passes a signal to a normally closed relay to open and to cut-off the power supply to the thermostat as well as fan controller thereby shutting off the fan unit; and activates the respective camera and the wireless transmission unit to transmit a signal to a wireless receiver connected to the micro-controller so as to display the location of the fire on the display unit connected to the micro-controller.

5. The system of claim 4, wherein said building comprises more than one fire zone.

6. The system of claim 4, wherein said telephone system is adapted to call fire department.

\* \* \* \* \*